April 15, 1952  H. R. FISCHER  2,592,672
AUTOMATIC DIMPLING MACHINE
Filed Dec. 17, 1946  7 Sheets-Sheet 1

INVENTOR
HOWARD R. FISCHER.
BY
Raymond G. Mullee
ATTORNEY

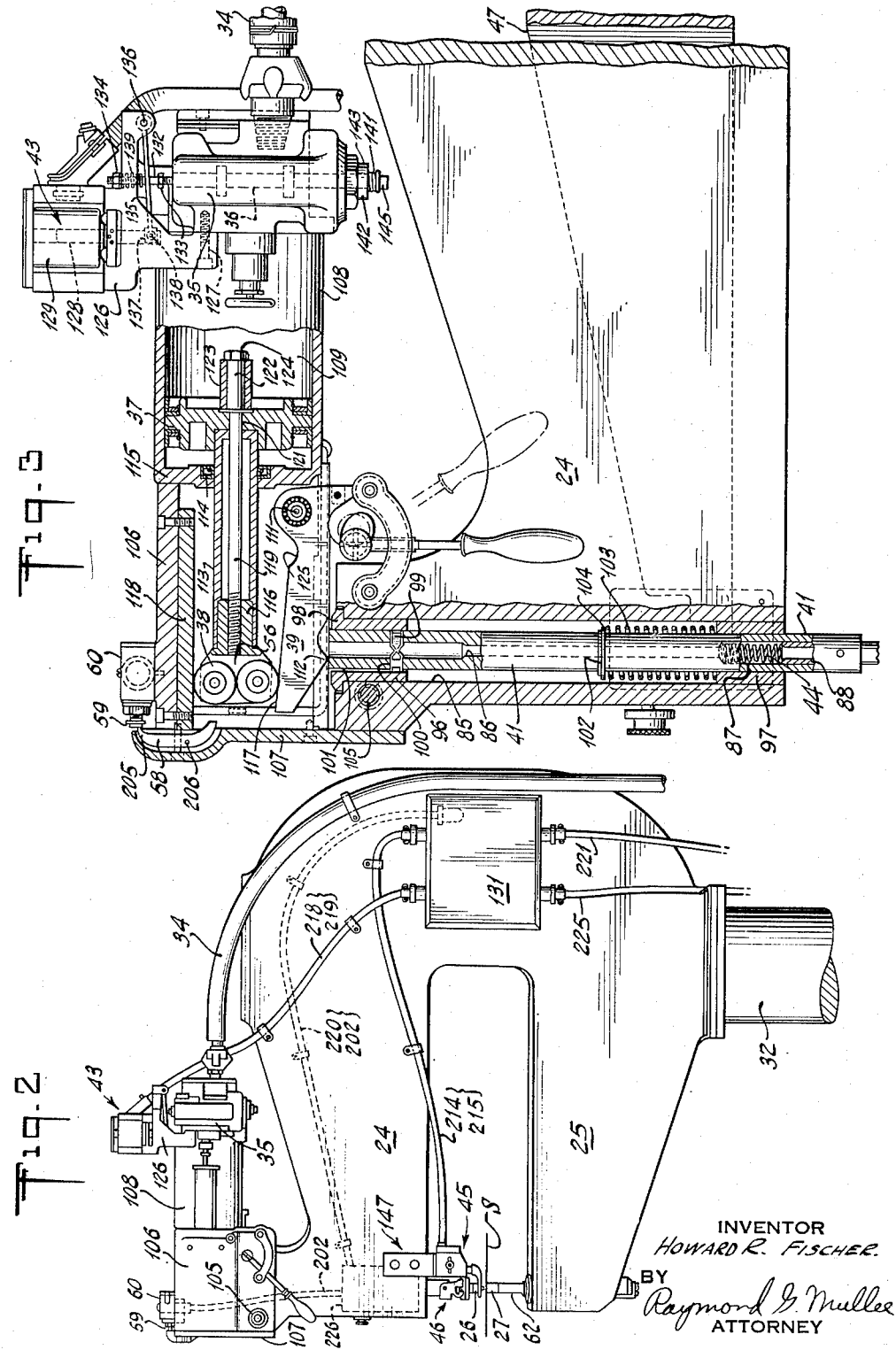

April 15, 1952  H. R. FISCHER  2,592,672
AUTOMATIC DIMPLING MACHINE
Filed Dec. 17, 1946  7 Sheets-Sheet 3
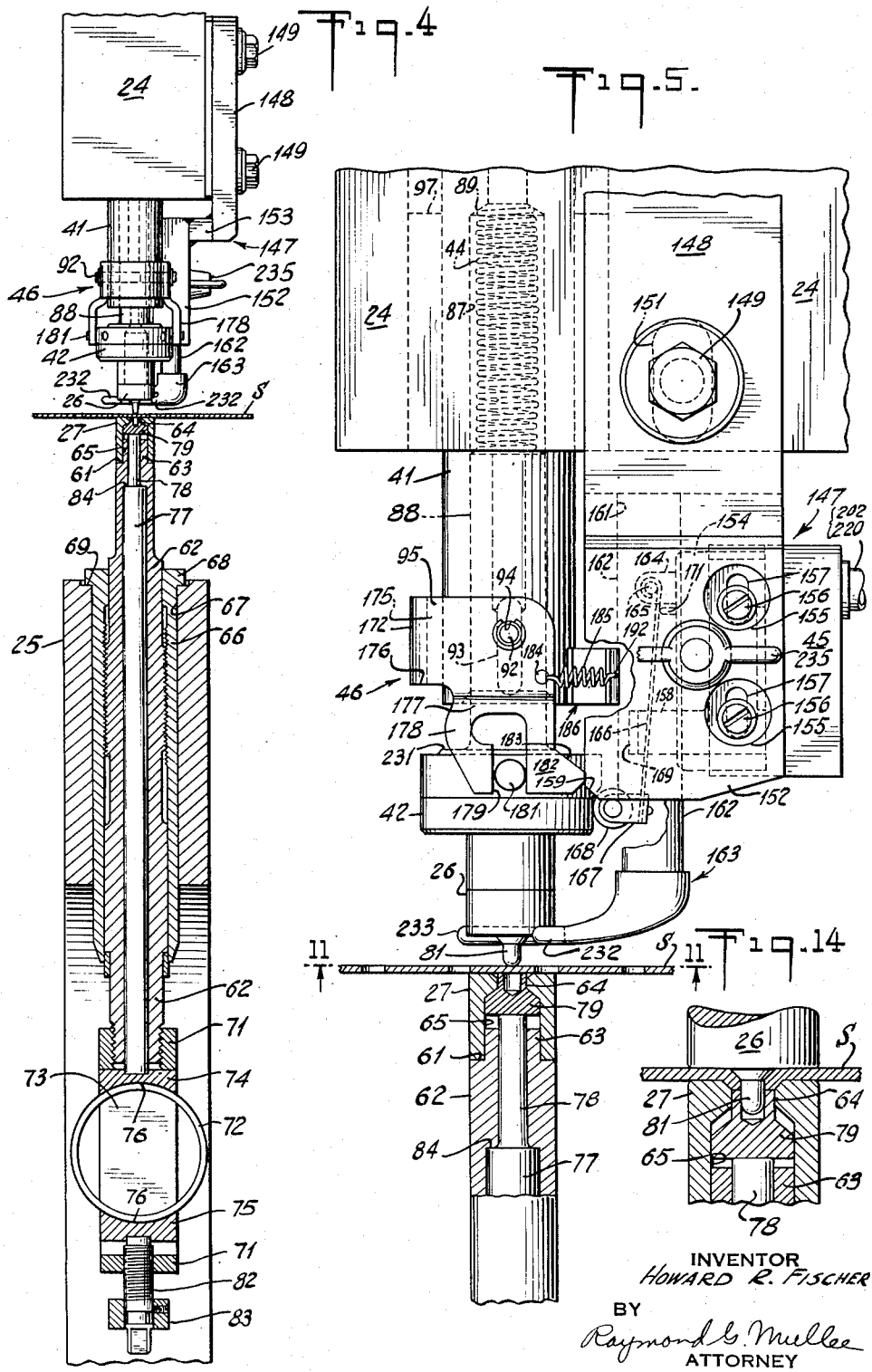
INVENTOR
HOWARD R. FISCHER
BY
Raymond G. Mullee
ATTORNEY

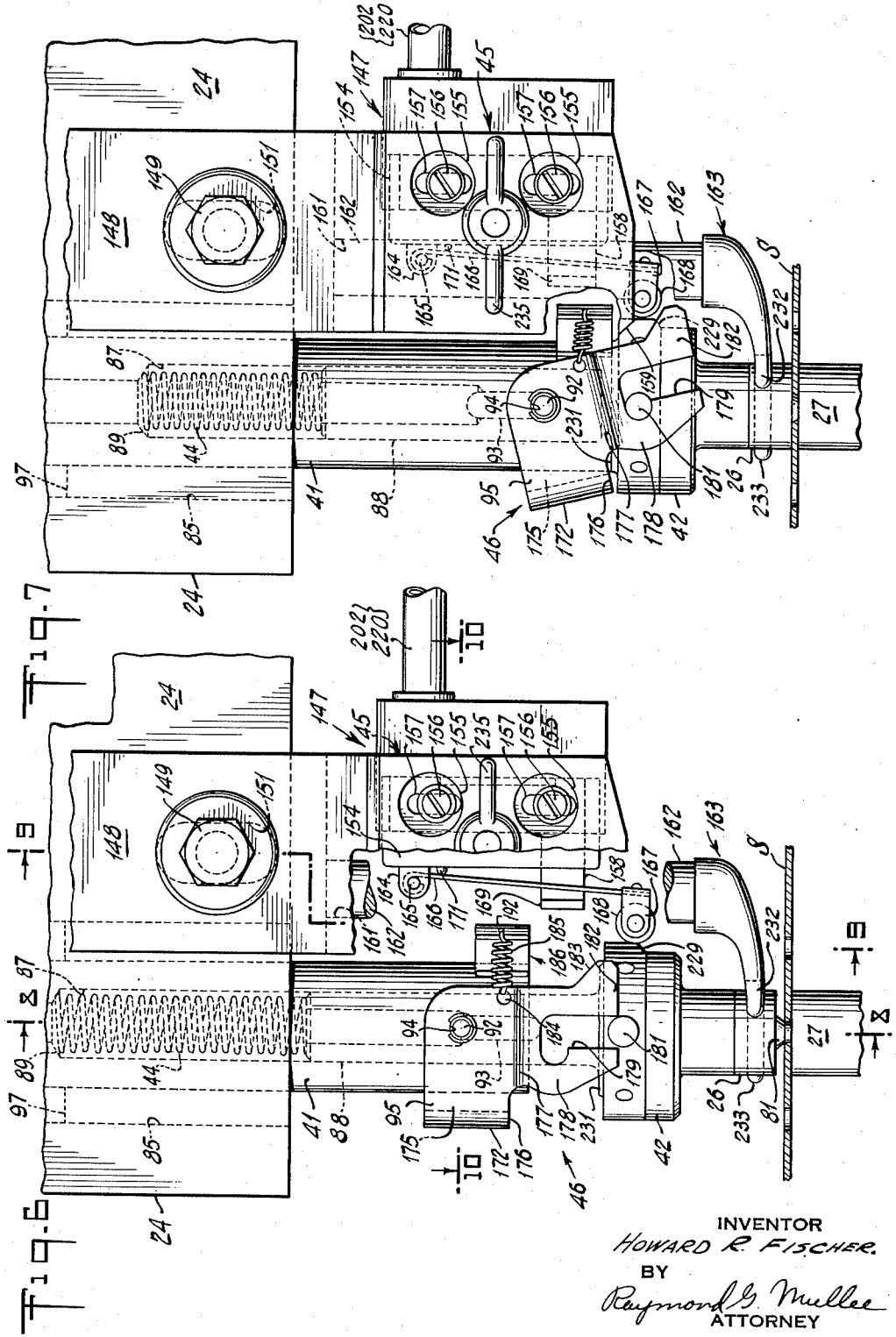

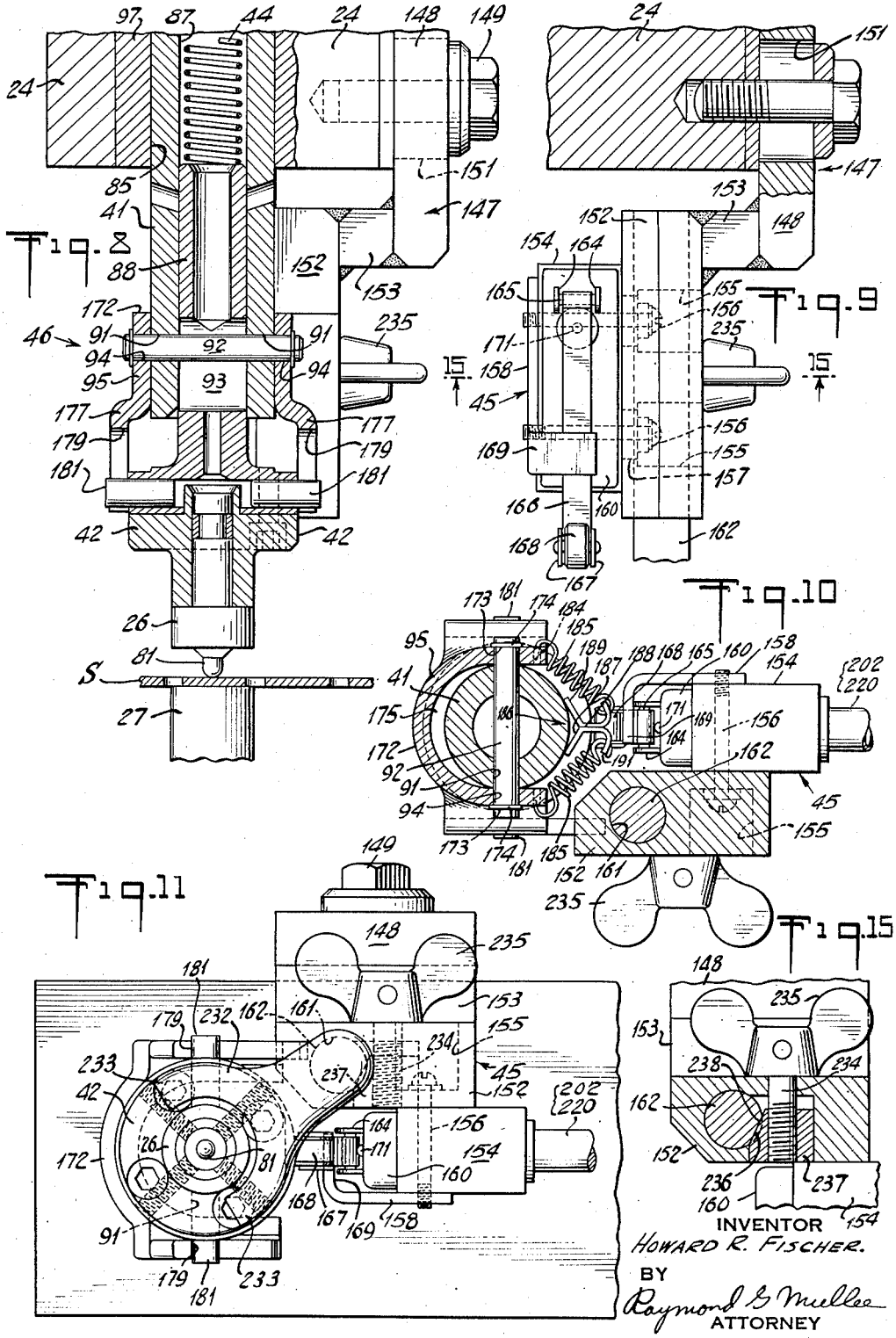

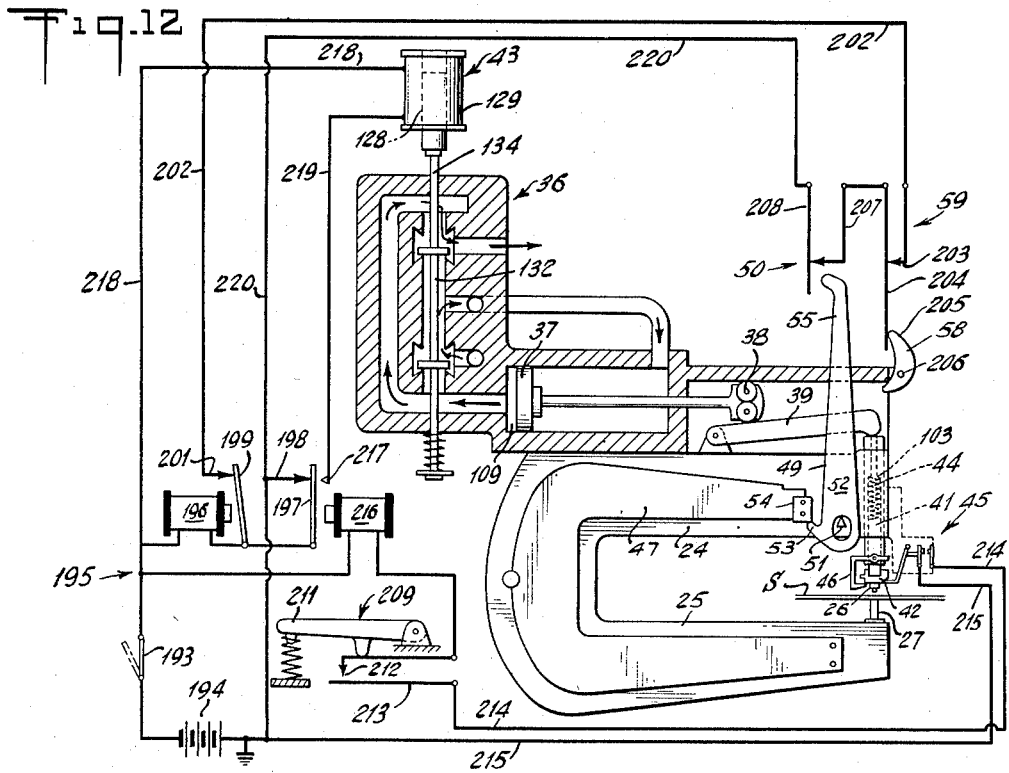
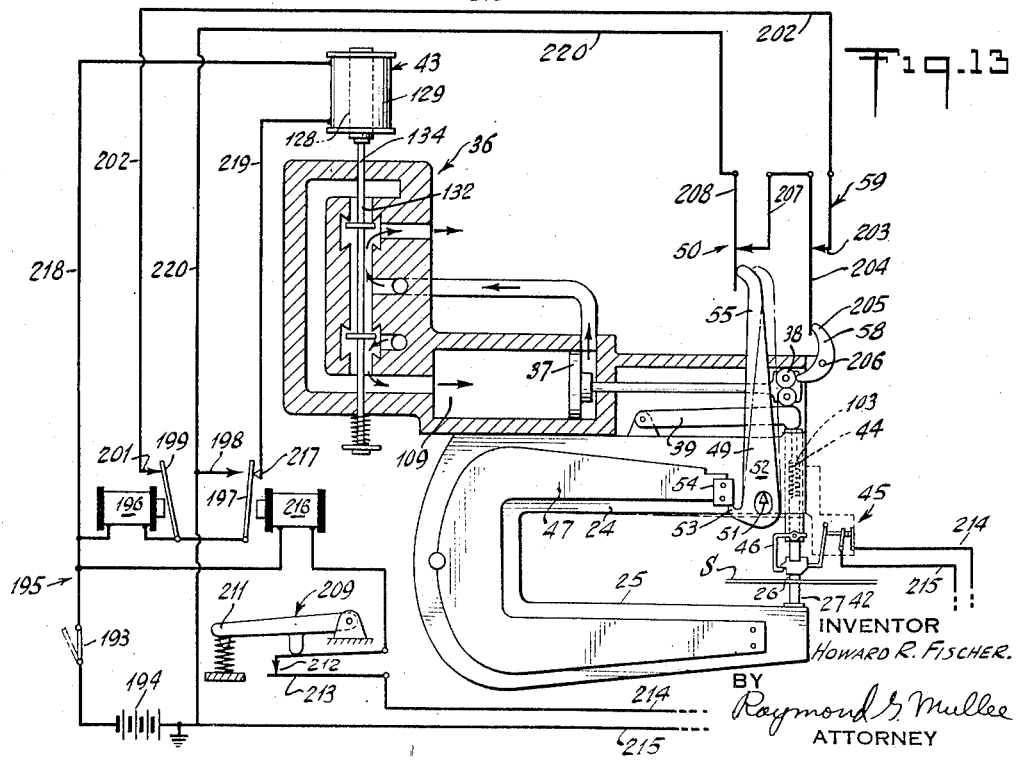

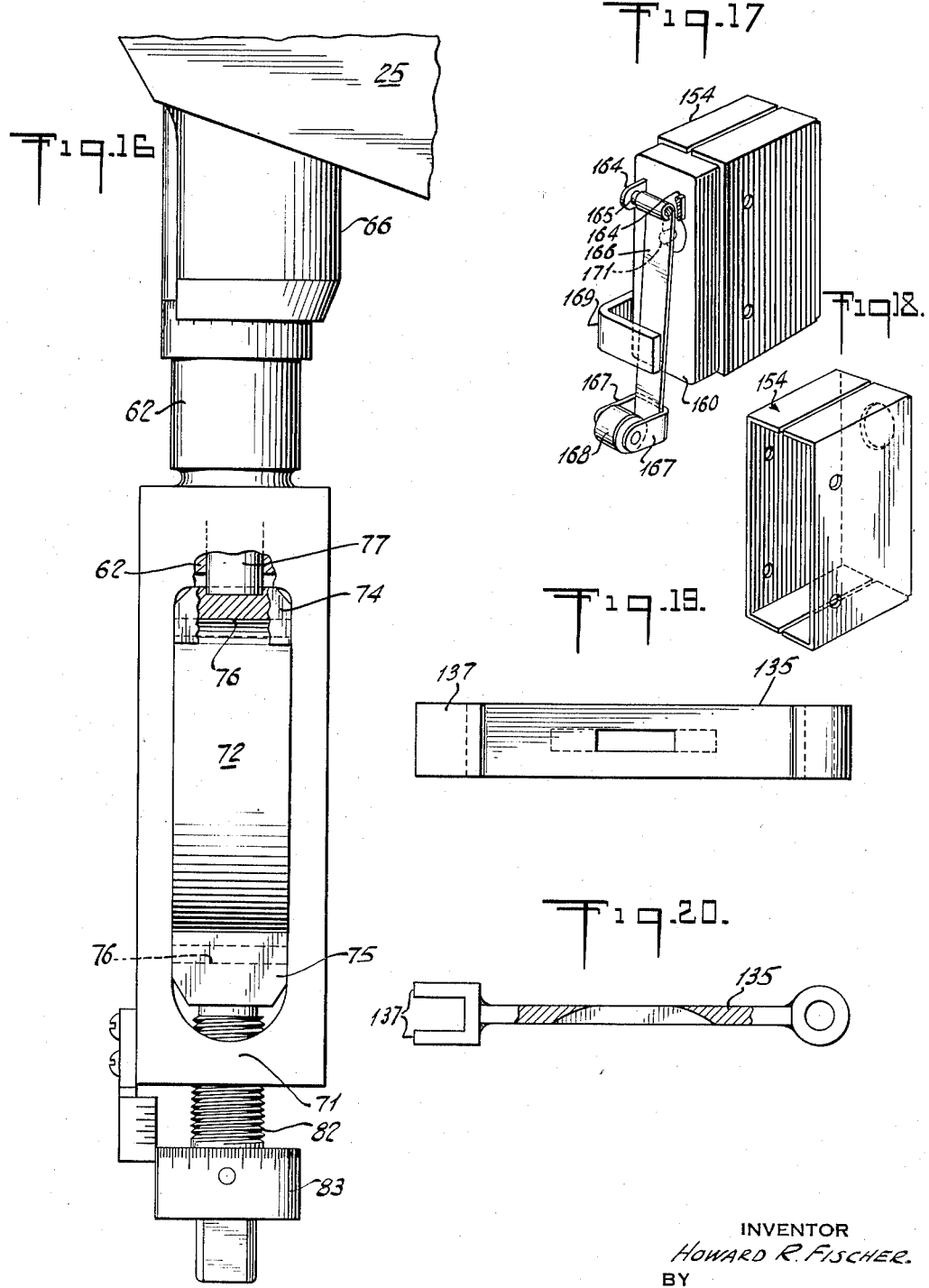

Patented Apr. 15, 1952

2,592,672

UNITED STATES PATENT OFFICE 2,592,672

AUTOMATIC DIMPLING MACHINE

Howard R. Fischer, Detroit, Mich., assignor to Chicago Pneumatic Tool Company, New York, N. Y., a corporation of New Jersey Application December 17, 1946, Serial No. 716,736

14 Claims. (Cl. 153—21)

This invention relates to fluid actuated machines for dimpling sheet metal and for similar industrial purposes, and particularly to control means associated with such machines for automatically closing an electric circuit to initiate the cycle of operations and for automatically opening such circuit to promptly stop and reverse the cycle upon the completion of the dimpling or similar stroke.

The main object of the invention is to provide a machine for automatically dimpling sheet metal or performing similar operations upon sheet metal wherein the entire cycle of operations is completed and the punching element is returned to initial position preparatory for a second cycle by the automatic performance of the machine, no action being required by the operator other than to position a work piece manually to initiate each cycle of operations.

Another object of this invention is to provide a fluid actuated machine for dimpling sheet metal or performing similar operations thereon wherein a punch, visible to the operator, may be brought into registration with a pre-formed aperture in a work sheet by manual movement by the operator, and thereby to initiate a cycle of operations that will be automatically completed and the punch returned to initial operative position without any further action on the part of the operator.

Another object of the invention is to provide such control means for automatically initiating operations upon the manual positioning of a work sheet by the operator as part of a system wherein the machine, after performing the dimpling or like operation, is automatically stopped and reversed by a solenoid controlled valve in response to a deflection of a portion of the body of the machine upon a predetermined working pressure being applied to the work piece.

Another object of the invention is to provide control means for a sheet metal dimpling machine or similar pressure device whereby the cycle of operations is automatically initiated by the mechanical closing of an electric circuit by the dropping of an operative member of the machine into a preformed hole in the work sheet upon the registration of the dimpling punch with such preformed hole by the manual movement thereof by the operator.

Another object is to provide a simple mechanical device in such a machine to lift the punch from the work sheet to a predetermined position in elevation upon the completion of a cycle of operations, and at a predetermined point of time rapidly return the punch by direct mechanical action to a position on the work sheet where the operator may immediately initiate a second cycle of operations by manually moving a work sheet to a predetermined position.

Another object of the invention is to provide a latching mechanism associated with the ram of a dimpling machine which, upon completion of the dimpling operation and on the return movement of the ram, will lift the punch holder from the work but at a predetermined point in the return movement of the ram will automatically release the punch holder to re-position the punch upon the work sheet preparatory to the initiation of a second cycle of operations by the manual movement of the work sheet by the operator.

Still another object is to provide such a latching mechanism to cooperate with spring means in the ram whereby the punch, upon the completion of the dimpling operation, will first be elevated by engagement of the latch with the punch holder upon the return movement of the ram and then automatically and rapidly returned to a position upon the work sheet by the force of the spring, sufficient time being allowed, however, during the elevational movement and before the release of the latch, to permit the operator to shift the work sheet to a desired position for reception of the punch preparatory to the initiation of a second cycle by the manual movement of the work sheet by the operator.

Other objects and features of the invention will appear more clearly from the following description taken in connection with the accompanying drawings and appended claims.

In the accompanying drawings:

Fig. 2 is a side elevation of the same machine as seen from the right side, but with the lower or base portion being broken off;

Fig. 3 is a fragmentary view of the upper operating mechanism of the machine shown in Fig. 2 with certain parts shown in section to disclose the interior construction;

Fig. 4 is a front view of the dimpling punch and die, with the punch holder and latching mechanism shown in elevation and the position regulating mechanism in longitudinal section;

Fig. 5 is an elevational view, from the right side, of the latching mechanism on the ram in elevated position with the punch resting on a work sheet and the punch switch in open position, the lower part of the figure being in section to show the die;

Fig. 6 is an elevational view of the latching mechanism on the ram in elevated position with the punch dropped into a preformed hole in a work sheet, the switch being in closed position instantly before the ram is operated into pressing position;

Fig. 7 is an elevational view of the ram in pressing position at the end of the power stroke with the latch lowered into engagement with the punch holder preparatory to lifting the punch upon the elevation of the ram;

Fig. 8 is a longitudinal section along the line 8—8 in Fig. 6;

Fig. 9 is a longitudinal section along the broken line 9—9 in Fig. 6;

Fig. 10 is a cross-section along the line 10—10 in Fig. 6;

Fig. 11 is a bottom view from the line 11—11 in Fig. 5;

Fig. 12 is a schematic diagram of the electrical apparatus and connections showing the parts in idle condition but ready for operation;

Fig. 13 is a diagram similar to Fig. 12 showing the parts at the end of the power stroke and immediately before the opening of the deflection switch;

Fig. 14 is a view, chiefly in longitudinal section, of the punch and die upon the completion of the dimpling operation;

Fig. 15 is a section through the bracket plate at line 15—15 in Fig. 9 showing the device for holding the stripper member in operative position;

Fig. 16 is an elevational view of the die spring and adjusting apparatus viewed from the right in Fig. 4;

Fig. 17 is a perspective view of the leaf spring and cam follower mounted upon the switch box;

Fig. 18 is a perspective view of the punch switch box before assembly;

Fig. 19 is a plan view of the solenoid valve lever; and

Fig. 20 is a side view, partly in section, of the solenoid valve lever.

Figure 1:
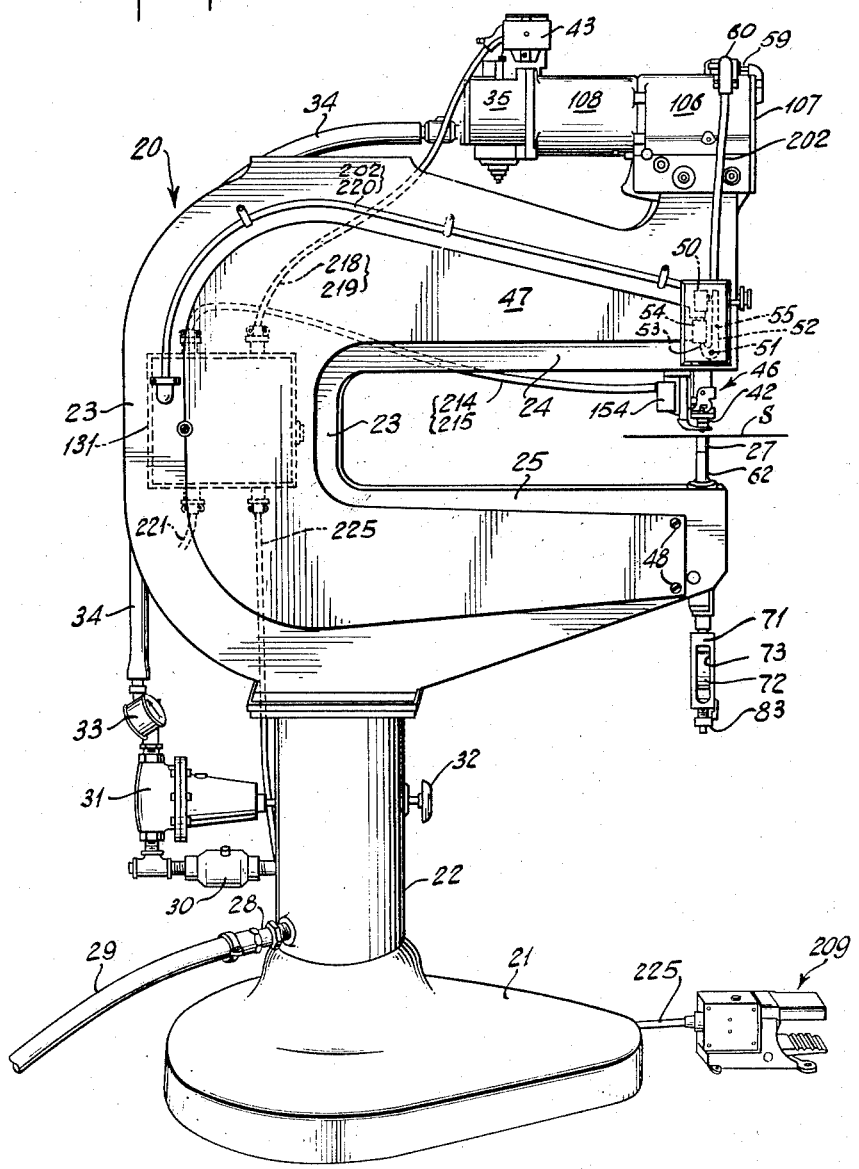
Fig. 1 is a perspective view, from the left side, of a dimpling machine made and equipped according to the invention and embodying the salient features thereof in practical form.

Figs. 1 and 2 are drawn to a relatively small scale; Fig. 3 to a larger scale; Fig. 4 to a still larger scale; and Figs. 5 to 11 inclusive, 15, 16, 19 and 20 to an even larger scale. Fig. 14 is on a larger scale than any other figure.

Referring still to the drawings, the dimpling machine, which is the illustrative embodiment of the invention, is generally indicated at 20 in Fig. 1 and comprises a base 21, a columnar support 22, and a more or less massive yoke 23 terminating at the front of the machine in opposed jaws 24 and 25 which respectively carry a movable dimpling punch or set 26 and a stationary dimpling die 27. Power to actuate the punch derives from pressure fluid introduced into the machine through an entrance fixture 28 from a hose line 29 connected to an appropriate outside source of compressed air. From the entrance fixture 28 the pressure fluid passes through an air line oiler 30 and a pressure regulator 31 controlled by a regulator screw 32, past the pressure gauge 33, and thence up through a hose line 34 to the valve housing 35. Referring now to Fig. 3, pressure fluid passes through a control valve 36 in the housing 35 to drive forwardly a reciprocating piston 37 with which are associated rollers 38 transmitting motion to cam lever 39 to actuate the ram or set holder 41 downwardly on its power stroke. Ram 41 on its power stroke exerts dimpling pressure upon the punch holder 42 which carries the punch 26, and in coaction with the stationary die 27 forms a dimple in a preformed hole of the work sheet. An electrical system, including a solenoid 43, functions, as hereinafter described, to actuate the control valve 36 and thereby the direction and flow of the pressure fluid to the piston 37.

The invention includes means whereby the punch holder 42 and dimpling punch 26, as best shown in Figs. 6, 7 and 8, may drop upon the work sheet S and ride thereon until the operator shifts the sheet to register the punch with a preformed hole of the work sheet. When the punch is riding on the work sheet, as in Fig. 8, the machine is idle. When brought into registration with a preformed hole, as in Figs. 6 and 7, the punch is forced through the hole by a compression spring 44; and the punch holder 42, in moving downwardly, automatically closes a micro-switch 45 (hereinafter referred to as "punch switch") in the circuit, as later described, to energize the solenoid 43 and thereby to open the control valve 36 to move the piston 37 to actuate the ram 41 upon its power stroke. The invention also includes a latching mechanism, generally indicated at 46, mounted on the ram, as hereinafter more fully described, to reciprocate with the ram. The latching mechanism 46 functions to engage the punch holder 42 when the ram has completed its power stroke; and upon the return movement of the ram, the latch carries the punch holder with it to a predetermined point at which the latch is cammed into unlocking position, as hereinafter more fully described, and the punch holder is permitted to drop to the work sheet S to be in position to initiate a new cycle of operation as soon as the operator registers the punch with another preformed hole.

In the illustrative embodiment two means are disclosed for stopping the power stroke of the ram and reversing the operation. Such means are more fully described in the copending application of Howard R. Fischer and James A. Roberts, Serial No. 514,068, now abandoned. Briefly considered, and as best shown in Fig. 1, and diagrammatically in Figs. 12 and 13, one such means captures relative movement between the jaw 24 and the deflection plate 47 to pivot the arm 49 to open switch 50 in the circuit supplying current to the solenoid control valve 36. The heavy pressure of the dimpling operation forces jaws 24 and 25 slightly but measurably apart within the elastic limit of the material of which the jaws is composed, preferably boiler plate steel. Deflection plate 47 is rigidly secured by screws 48 to the lower jaw but rides free of the upper jaw. Consequently it is subjected to no such pressure and remains stationary relative to the lower jaw. When, therefore, jaw 24 moves upwardly in response to the dimpling pressure upon the work piece, pivot 51, which is mounted on the jaw, moves upwardly therewith carrying with it the lever 52. Since the plate 47 remains stationary, the short actuating arm 53 of the lever 52 will engage the trip member 54 of the deflection plate during such upward movement, and the relatively long upright arm 55 will swing counterclockwise about the pivot 51 to open the switch 50 to de-energize the solenoid 43 and thereby close the control valve 36. Spring means (not shown) returns the lever to initial position. The second stopping means comes into action in the event that the piston 37 runs to the extreme forward end of the cylinder 108 without tripping the deflection switch 50. When dimpling operations are performed on thin sheets, for example, there may not be enough strain on the yoke to operate the deflection pressure switch 50. In such case the piston 37 will overrun and the roller 38 rotatably mounted on the block 56 will strike the lower end of the lever 58. Pivoted lever 58, thus actuated by the roller 38 at the end of the forward stroke of the piston 37, opens stop switch 59 in the switch housing 60 to break the circuit of the solenoid 43 and thereby cause the control valve 36 to reverse. It is intended that the present invention shall form an improvement to a dimpling or riveting machine or press which is already provided with such deflection and/or automatic stopping device or devices. In such an assembly, the end-of-stroke switch is provided primarily for use at times when the machine has been converted to a riveter, instead of a dimpler. Its usual function is to enable the operator to predetermine the degree of approach of the rivet set toward the dolly, and hence the height of the upset rivet, by adjusting the dolly relative to the yoke and by permitting the piston to run the full stroke. The full stroke is made possible by disabling the deflection switch whenever the operator elects to predetermine the height of the rivet rather than the compressive force thereon.

The stationary dimpling die 27 is supported on an annular shoulder 61 of the adjusting screw member 62 and is located by a centralizing cylindrical extension 63 of said screw member. The die has a central aperture 64 (Fig. 14) shaped to receive the dimpling punch in the course of the dimpling operation and to provide clearance for the metal displaced downwardly by the punch, said aperture leading into the bore 65 of the die. The adjusting screw member 62 is threadably mounted in sleeve 66 (Fig. 4) which is disposed in a receiving bore 67 in the yoke jaw 25. Sleeve 66 has a radially extending retaining flange 68 which is seated on an annular ledge 69 formed adjacent the upper face of the jaw 25. By turning screw 62 relative to sleeve 66, the height of die 27 relative to jaw 25 on yoke 23 may be regulated to accommodate sheet metal of different thicknesses.

The adjusting screw member extends downwardly from and beyond the yoke jaw and threadably carries the holder 71 of the ring spring 72. Ring spring 72 (Figs. 4 and 16) is mounted transversely in the slot 73 in the holder and is maintained in operative position by transmission blocks 74 and 75 each of which is formed with an arcuate surface 76 to engage the periphery of the ring spring. The arcuate surfaces have slightly larger radii than that of the ring spring. Extending longitudinally through the adjusting screw member and projecting beyond its ends is a push rod 77. The upper portion 78 (Fig. 14) of the push rod is of reduced diameter and extends through and beyond the die centralizer 63 formed at the upper end of the screw member 62. The upper terminus of the push rod supports a compression block 79 which is arranged in the die bore adjacent the central aperture 80 of the die and is adapted to be actuated downwardly by the edge of the sheet metal S being dimpled. Block 79 functions to coin the edge of the dimple by applying thereto a reactive force transverse to the plane of sheet S tending to cause the metal to flow upwardly and fill up the sharp corner adjacent the punch on the upper surface of the sheet S. Edge coining is a common expedient in the dimpling art for the primary purpose of setting up stresses at the edge of the hole to condition the metal to withstand greater stretch of the hole without radial cracking.

As the punch moves downwardly in performing the dimpling operation, a part of its force is absorbed by the stationary die and its supporting elements including the yoke jaw 25, and a part is transmitted to the compression block 79 and thence to the push rod 77. The lower end of the push rod cooperates with the transmission block 74 which transmits the latter part of such force to the ring spring 72 by which it is absorbed. This will result in the ring spring assuming a slightly ellipsoidal shape, allowance for which is made in the shaping of transmission blocks 74 and 75, as previously described. Arranged below and in cooperation with the lower transmission block 75 and mounted in the holder 71 is a screw 82 for the micrometric adjustment of the compression of ring spring 72, said screw having a graduated knob 83 thereon. By rotation of the screw 82 upwardly through the holder 71, compression is applied through the transmission block 75 to the ring spring and thence through the upper transmission block 74 to the push rod 77 and the compression block 79 whereby to predetermine the reactive force of block 79 against the edge of the dimple while coining the latter during the dimpling operation. Near the upper end of the push rod a shoulder 84 is formed by the reduced diameter of the push rod extension 78 to retain the rod against upward movement in response to the pressure of the ring spring when the punch is elevated upon the completion of the dimpling operation. It has been found that the resilient opposition of the compression block 79 as transmitted to it by the push rod from the ring spring will operate most effectively to coin the edge of the dimple. The arrangement of the ring spring and push rod to support the edge coining block is old per se; but the adaptation of such an idea in combination with other features is considered novel.

The upper jaw 24 has a complementary movable dimpling punch or set 26 mounted in the punch holder 42 which is removably mounted in the ram or set holder 41 and is capable of being brought down during operation toward the stationary die. The ram 41 (Fig. 3) is slidably mounted for vertical movement in bore 85 in the upper jaw 24 and is itself formed with a longitudinal bore 86 and a counterbore 87 at its lower portion. Counterbore 87 (Figs. 6 and 7) forms a socket for the shank 88 of the punch holder 42 and also provides a housing for the spring 44 which is preloaded under compression between the punch holder shank and the internal shoulder 89 of the bore to urge the punch holder downwardly. The ram has radial bores 91 disposed in diametrically opposite positions therein adapted to mount a cross pin member 92. Said cross pin 92 extends through a longitudinal slot 93 in the shank 88 of the punch holder 42 thereby limiting the longitudinal movement of the punch holder in reference to the ram, and also projects through radial bores 94 in latch body 95 of the latching mechanism 46 as will be hereinafter more fully described. Since the compression spring 44 urges the punch holder downwardly, the punch holder will normally tend to maintain itself in the most downward position permitted by pin 92 in the cross slots 93.

The ram 41 (Fig. 3) is slidably mounted for vertical movement in a pair of spaced but aligned bushings 96, 97 arranged in jaw bore 85. Bushing 96, which is mounted with a forced fit in the bore 85, is formed with a radially extending retaining flange 98 which seats in the jaw, and bushing 97 is mounted with a forced fit in bore 85. A key 99 is mounted in a transverse slot 100 in the upper portion of the ram and projects into a keyway 101 in the bushing 96. Key 99 serves to hold the ram 41 against rotation relative to the bushing 96, and since the bushing is securely fixed to the yoke by a force fit, the ram will not rotate during operation. A retainer ring 102 is secured to the ram approximately midway its length and engages with a compression spring 103 which rests upon the bushing 97. Spring 103 tends to raise the ram 41 toward its upper inactive position, and upon the return of the piston 37, after the power stroke, the spring will force the ram upwardly to its initial or inactive position. A suitable washer 104 is disposed between the spring 103 and the retainer ring 102.

At its front end, and as shown in Fig. 2, the upper jaw 24 of the yoke extends upwardly and cooperates with a pair of transverse bolts 105 (one shown) in supporting an upper frame 106 thereon, said frame being generally inverted U-shaped in cross section. The front end of the frame 106 is closed by a plate 107. The rear end of the frame is bolted to a fluid drive cylinder 108 which contains a chamber 109 and which in turn is bolted to control valve housing 35. As shown in Fig. 3 operating cam lever 39 is pivoted at 111 within the frame 106 and is provided with a nose 112 making active contact with the upper end of the ram 41 and during operation serves to depress the ram to cooperate with the punch holder 42 to bring the movable punch 26 and the stationary die 27 into coaction to form a dimple.

The cylinder chamber 109 contains the reciprocable piston 37 provided with a hollow piston rod 113 extending slidably through a seal 114 in the front end wall 115 of the cylinder, the forward end of the piston rod receiving a boss 116 forming an extension upon the forked roller block 56 on which a pair of rotatable rollers 38 are mounted one above the other. The lower roller rides upon the upper approximately straight surface 117 of the cam lever 39 while the upper roller rolls along the under surface of a rail 118 secured within the top of the upper frame 106. Rollers 38 roll over each other thereby relieving the forked block 56 of a large part of the reaction which is transmitted from the cam lever upwardly through the rollers to the rail 118 and yoke. An inner piston rod 119 is screwed at its forward end into the boss 116 of the roller block and passes through the piston at 121. On the rear side of the piston head, rod 119 has a portion 122 of increased diameter surrounded by a sleeve 123 retained in association therewith by a nut 124 screwed on to a reduced portion at the rear end of said rod. Thus, if the piston is in a rearward position, the roller block will also occupy a rearward withdrawn position in which the lower roller engages in the curved recessed portion 125 of the cam lever near the pivot 111 thereof thereby allowing the cam lever to swing upward about the pivot to a high inclined position. When the roller block 65 is forced forward by the forward travel of the piston 37, the rollers 38 engaging against the rail 118 and cam lever 39 will obviously swing the latter down to cause the ram 41 to descend to force the dimpling punch 26 into cooperation with the dimpling die 27. At the beginning of the forward movement of the piston, the lower roller 38 will engage the forward wall of the curved recess 125 thereby causing the forward or nose end of the lever to move down rapidly. As the piston progresses, it engages the upper straight surface 117 of the lever and moves more slowly than at first but with uniform mechanical advantage or speed ratio between the piston 37 and the ram 41. The result is that the pressure on the dimple surface is uniform throughout the power stroke as long as the air pressure behind the piston 37 is constant. Within limits, therefore, variations in the thickness of the metal sheets being operated on, with corresponding variations in the length of the power stroke, will not alter the shape of the dimple or the intensity of the force applied thereto.

In order to actuate the piston, as just indicated, and thereby the cam lever and ram, pressure fluid is transmitted through control valve 36, the fluid being introduced into the machine as heretofore described. A valve suitable for the illustrative embodiment and operating on a reciprocable principle is shown in the copending application of Howard R. Fischer and James A. Roberts, supra, reference to which is made for a more complete description.

Such a valve is raised and lowered in response to an electro-magnetic coil device or solenoid 43. The solenoid 43 is supported on a frame 126 (Fig. 3) which is mounted on control valve housing 35 and secured thereto by bolts 127 (one shown). The solenoid comprises a core 128 reciprocating in a coil 129 rigidly mounted upon frame 126 and connected by a conductor, as hereinafter described, to a terminal box 131. The valve stem 132 is screw-threaded for reception of two spaced adjusting nuts 133 and 134. Above nut 133 the sides of the valve stem 132 are flattened to fit a rectangular slot in a lever 135 (see Figs. 19 and 20). The rear end of the lever is pivoted at 136 on frame 126, and the front end has a forked portion 137 engaging a horizontal pin 138 carried by solenoid core 128 whereby the reciprocating movement of the core causes the lever to rock about its pivot. Lever 135 normally rests on lower adjusting nut 133 and is maintained in contact therewith by a compression spring 139 which encircles valve stem 132 and which is interposed between the lever and the upper adjusting nut 134. The two adjustment nuts 133 and 134 and the compression spring 139 are effective to transmit motion from the valve lever 135 to the solenoid 43. The spring 139 and upper nut 134 actuate the valve stem upwardly on the upward or power stroke of the solenoid and lever 135 whereas on the return stroke the valve stem 132 is carried down by the lever 135 in contact with the lower adjusting nut 133. Downward movement of the valve stem 132 is aided by a second compression spring 141 surrounding the lower end 142 of the valve stem 132 and extending between shoulder 143 on the sleeve member 144 and a collar 145 pinned to the valve stem. The purpose of the spring 139 is to prevent injury to the valve seats 146 due to the inertia of the solenoid core 128 and also to obviate the necessity of close adjustments.

As previously indicated, means are provided for automatically initiating a cycle of operations by the mechanical action of the punch holder in closing a switch in the circuit to the solenoid, such action taking place when the operator brings a preformed hole in the work sheet into registration with the pilot of the punch. Such means comprise a bracket 147 (Figs. 4, 8 and 9) which includes a body portion 148 rigidly attached to the upper jaw 24 by bolts 149. Body portion 148 is provided with slots 151 through which the bolts are disposed to permit vertical adjustment of the bracket in relation to the jaw. Plate 152 is joined to the body portion 148 by means of a block 153 welded therebetween and extends downwardly and substantially parallel to the body portion 148 to carry switch housing 154. Body portion 148 and plate 152 may, however, be made unitary, the welding of the two together by means of the joiner block 153 being only for simplification of manufacture. Plate 152 is formed with recesses 155 to seat the attaching bolts 156; and slots 157 (Fig. 5) in plate 152 through which bolts 156 are mounted provide for the vertical adjustment of the housing on the plate. Bolts 156 serve also to attach the lever retainer member 158 to the switch box 154. Plate 152 has a cut-off edge to provide a camming shoulder 159 (Figs. 5 and 7) and has a bore 161 within which is secured the shank 162 of the stripper member 163. The functions of the camming shoulder 159 and the stripper member 163 will be hereinafter more fully described.

Referring to Figs. 9, 17 and 18, the switch housing 154 is made of sheet steel, folded to the desired shape, and closely surrounds a block 160, the latter projecting beyond the open end of the housing. Mounted in the block 154 is a pair of lugs 164 between which is secured a horizontal pin 165 from which depends the lever 166. Lever 166, as best shown in Fig. 17, has riveted to its free end a furcated member 167 in which is journaled a shaft to carry the roller 168. Said lever is maintained in normal position (as shown in Fig. 5) by the flange 169 on the retainer member 158 and by the switch button 171 on the microswitch 45 which is mounted in block 160. The lever and roller are of relatively light weight and the switch button 171 is tensioned outwardly with sufficient force to maintain the lever against the flange 169. Counterclockwise movement (as viewed from the bracket side of the machine and in Figs. 5, 6 and 7) to close the switch button is imparted to the lever through the roller 168 as actuated by the downward movement of the punch holder 42, as hereinafter described.

Latching mechanism 46 has a U-shaped body 95 disposed to partially encircle the lower portion of the ram 41. As shown in Fig. 10, the curved portion 172 of the body 95 is in spaced relation to the ram 41 and the sides thereof are in contiguous relation to the ram. Body 95 has a pair of bores 94 drilled therethrough in opposed relation and adapted to register with the apertures 91 in the walls of the ram 41. Pin 92 is mounted to extend through the registered holes 91 in the ram 41 and through the holes 94 in the body of the latch member 46 so that the latch member may swing or pivot thereon. Pin 92 also extends through the longitudinal slot 93 in the shank 88 of the punch holder 42, as previously described. The outer ends of the pin are formed with grooves 173 into which retaining snap rings 174 are disposed to maintain the pin against axial movement. In other words, the latch member 46 will move longitudinally with the ram 41 but is pivotable thereon upon the pin 92, whereas the punch holder 42 moves with the ram 41 but is also adapted to move longitudinally with reference thereto and independently hereof to the extent permitted by the slot 93 in the shank of the punch holder 42.

The latch body 95 is disposed so that a clearance space 175 is provided to allow for the tilting of the latch from the position shown in Fig. 6 to the position shown in Fig. 7. It is to be noted that the lower edge 176 of the U-shaped portion does not touch the tool holder 42 when in tilted position. Latch body 95 is joined by a curved portion 177 to depending side portions 178 in each of which is a bayonet slot 179. Such slots are disposed on diametrically opposite sides of the extension of the axis of the ram and are adapted to slidably receive the pins 181 projecting from diametrically opposite positions on the punch holder 42. The depending portion 178 is formed with a projection or trip finger 182 the upper portion of which has a cut-off or chamfered shoulder 183 adapted to act as a camming surface in cooperation with the camming shoulder 159.

Latch body 95 has a pair of small drilled holes 184 (Fig. 10) which serve as anchor means for the terminals of the springs 185 of the tilting device generally indicated in Figs. 6 and 10 as 186. Tilting device 186 comprises a pair of support members 187 welded together at their central portions 188 and having angularly projecting flanges 189 which form a saddle to seat the device against the ram 41. The support members curve outwardly and rearwardly to form a pair of holding wings 191 each of which is provided with a spring anchor hole 192. As best shown in Fig. 10, springs 185 are anchored in the wings 191 and in the end portions of the body member 95, and are thereby adapted to exercise a pulling or tilting force upon the body of the latch with the pin 92 as a pivot.

The various electrical connections and instruments used, such as switches and relays and the like, in their details are illustrated in diagrammatic form in Figs. 12 and 13. In both the foregoing figures, the parts, either simplified or modified in form, nonetheless are indicated as far as possible by the same reference numbers as borne by the corresponding actual parts in the other figures already described. The first of these two diagrams shows the apparatus in initial condition after the main line switch 193 has been closed and the apparatus or system is ready for operation. Closing the switch 193 connects the system to a source of electromotive force, diagrammatically indicated by a battery 194, and closes a circuit 195 extending from said source through the winding of a relay 196 and through a relay armature 197 and back contact (or break contact) 198 to ground. When relay 196 becomes energized, its armature 199 moves into engagement with a front contact (or make contact) 201 to connect the grounded end of relay winding 196 through armature 199, front contact 201, and conductor 202 to a fixed contact member 203 of the stop switch 59. A movable contact member 204 of the stop switch is controlled by the end 205 of the stop switch lever 58 pivoted at 206 to the upper rail member. Said movable contact member 204 is connected to a fixed contact member 207 of deflection switch 50 while the latter has a movable grounded contact member 208 controlled by the upper arm 55 of the deflection switch trip lever 49.

The apparatus includes a shiftable foot-operated switch 209 for controlling operation. A depressible treadle 211 controls the movable contact member 212, and when the operator depresses the treadle said movable contact member 212 is brought down into contact with the fixed contact member 213 thereby directing current through the conductor 214 to one side of the punch switch 45. When switch 45 is closed by the dropping of the punch holder, current is led through the conductor 215 to ground. Relay 216 is thereby energized and armature 197 associated with the relay is shifted away from the grounded back contact 198 into active engagement with the front contact 217. This operation of armature 197 passes current from the source 194 through the conductor 218 to the solenoid 43, the current also continuing through conductor 219, contact member 217, armatures 197 and 199, contact member 201, conductor 202 to and through stop switch 59 as well as deflection trip switch 50 through conductor 220 to ground. It is to be noted that after the relay 196 is energized and the armature 199 moves into engagement with contact 201, a grounding circuit is provided for the relay 196, so that when the circuit 195 is later disturbed by movement of armature 197 away from contact 198, the relay 196 will remain energized by virtue of the grounding circuit through armature 199, contact 201, conductor 202, switches 59 and 50, contact member 208 and conductor 220 to ground, and will remain energized until either of switches 59 or 50 is opened. The solenoid, energized by the current, instantly raises the core 128 to its upper operative position, thereby elevating the valve stem 132 and allowing pressure fluid from the supply passage to pass through the valve 36 into the rear portion of cylinder chamber 109 to drive piston 37 forward from the position shown in Fig. 12 toward that of Fig. 13. It is apparent that the foot treadle 211 must remain depressed for the machine to operate and that whenever the operator permits the treadle to elevate, the solenoid circuit is broken at the relay contact 217 and the solenoid valve 36 moves to, or remains in, its normal position. Similarly, when the deflection trip lever 49 or the stop lever 58, as the case may be, opens the circuit to the solenoid, the solenoid is de-energized, its magnetic field is extinguished, the valve stem 132 drops and reverses the pressure fluid supply, the forward trend of the piston and the downward movement of the ram 41 are stopped, the ram elevates under the urging of spring 103, and the latching mechanism 46 engages the punch holder 42 to lift the associated punch 26 out of the dimpled hole, thereby permitting the operator to shift the sheet S to disaline the dimpled hole with the punch. Near the end of the upward stroke of the ram 41, the latch 46 is unlocked to permit the punch holder to drop to the work sheet, to be in position to initiate a new cycle of operation as soon as the operator shifts the work sheet S so that a drilled hole registers with the punch. It will be seen that de-energization of solenoid 196 by interruption of the circuit through switch 50 or switch 59 resulting from movement of deflection trip lever 49 or stop lever 58 respectively, results in the movement of armature 199 back to its initial position where it remains until armature 197 is caused to engage back contact 198. The latter action or condition cannot occur until solenoid 216 is de-energized by circuit interruption through punch switch 45 or foot-operated switch 209. It will be evident that once the solenoid valve 36 is shifted to non-operative or normal position by breaking of the contact in either switch 50 or switch 59, it will remain in such position even when the contact in either switch 50 or switch 59 is re-made, as long as solenoid 196 remains de-energized. Thus solenoid valve 36 cannot again be put into operative position until a new operating cycle is brought about by operation of foot switch 209 and/or punch switch 45.

Reference is to be had to Figs. 1 and 2 for the arrangement of the electrical system in connection with the various actual parts of the machine. Terminal switch box 131 is mounted on the yoke by suitable means and is connected with a source of electromotive force by conductors enclosed within conduit 221 controlled by switch 193. From said switch box 131 connections are made by the pair of conductors 218, 219 leading to the coil of solenoid 43; the pair of conductors 214 and 215 leading to the punch switch 45; and the pair of conductors 202 and 220 leading to the serially connected deflection trip switch 50 and end-of-stroke switch 59; all of said conductors being enclosed within suitable conduits. Another conduit 225, carrying suitable conductors, extends from the box 131 to the foot switch 209.

In operation, a work sheet, indicated on the drawings as S, containing preformed holes which are to be dimpled, is initially positioned to rest upon the stationary dimpling die 27, and the dimpling punch 26 is permitted to rest upon the work sheet. The cycle of operations is then begun by the operator manualy shifting the work sheet until a preformed hole is brought into registration with the dimpling punch, at which time the spring 44 will force the punch holder 42 downwardly, independently of ram 41, to advance the punch 26 partly through the preformed hole. As the punch holder moves downwardly, its shoulder 229 (Figs. 6 and 7) contacts the roller 168 forcing it inwardly thereby moving the spring pressed lever 166 counterclockwise (as viewed from the bracket side of the machine) to actuate the punch switch button 171 to close the punch switch 45 to complete the operating circuit to energize the solenoid 43 to shift the power unit control valve 36 to drive the piston 37 forward. The ram 41 is then driven downwardly by the cam lever 39 (Fig. 3), and its lower end is moved toward the upper shoulder 231 of the punch holder 42, which at this time is stationary. During such movement, the latch 95, which is mounted upon the projecting ends of the cross pin 92, moves downwardly with the ram and, although constantly urged to pivot or swing inwardly by the tilting device 186, the latch mechanism remains in the Fig. 6 position. As the latch drops, the pins 181 projecting from the punch holder 42 slide upwardly into the bayonet slots 179, until they reach the enlarged upper end thereof, whereupon the latch, as shown in Fig. 7, will pivot under the tension of spring 185 to cause the pins 181 to lock in the bayonet slots 179. At the same time, the lower end of the ram 41 is brought into engagement with the shoulder 231 on the punch holder 42. Continued downward movement of the ram is accompanied by movement of the punch holder to cause the punch 26 to dimple the sheet metal S as shown in Fig. 14.

As the dimpling pressure increases, the jaws 24 and 25 are gradually forced apart under the strain of the force transmitted through die 27 added to that transmitted through edge coining block 79, causing a relative movement between the upper jaw 24 and the stationary deflection plate 47. This relative movement is utilized to actuate the deflection lever arm 49 to open the switch 50 in the solenoid circuit thereby to terminate the power stroke of the ram, as previously described. Under certain circumstances switch 59, instead of switch 50, is opened by the pivoted lever 58 and the power stroke of the ram is thus terminated. In either event, the opening of the switch opens the circuit to the solenoid to stop the downward movement of the ram. The ram then moves upwardly as urged by spring 44.

Upon the elevating or return stroke of the ram 41, in response to the expansion spring 103, the latch 95 moves upwardly therewith carrying the punch holder 42 by virtue of the engagement of the pins 181 in the enlarged ends of bayonet slots 179. Near the end of such upward movement the projection or trip finger 182 on the latch member contacts the bevelled corner or shoulder 159 on the bracket plate 152 and causes the latch member 95 to be cammed outwardly to unlatch the bayonet lock whereupon the punch holder 42, under the urging of the compression spring 44, drops, independently of the ram 41, so that the dimpling punch will again ride upon the surface of the work sheet S, preparatory to the beginning of a new cycle of operations.

It is obvious that upon the elevation of the ram and the punch holder the work sheet must be shifted by the operator before the punch holder drops back upon the releasing of the latch. If for any reason the operator should fail to shift the work sheet, the punch will drop back into the previously dimpled hole and a new cycle will automatically begin. No damage will thus be incurred although there will be a waste of time. However, ample time is provided in the interval between the completion of the dimpling operation and the releasing of the latch to permit the operator to shift the work sheet. It should be noted also that so long as the punch rides upon the surface of the work sheet, the mechanism cannot operate and the machine is in idle position. This added factor of safety is of importance as a preventive against the starting of the machine by the accidental closing of the foot switch.

When forming dimples in a very heavy work sheet, it has been found that the metal is sometimes pressed in so tightly on the punch as to prevent the extrication of the punch from the work sheet and that in such case the work sheet will elevate with the ram and punch. Stripper member 163 is therefore provided to force the sheet away from the punch upon the upward movement thereof. Said stripped member comprises a forked portion 232 (Figs. 6 and 11) whose tangs 233 extend partially around the punch with an allowance for operative clearance, and an upwardly extending shank 162 which is mounted in the bore 161 in the bracket plate to which it is secured by a set screw 234 controlled by wing nut 235; (see Fig. 15). The shank 162 is formed with a flat 236 against which the block 237 is clamped by the action of set screw 234. Block 237 has an angularly formed flat shoulder 238 and is threadably mounted upon the set screw 234. Upon forward rotation of the screw, block 237 is drawn outwardly so that its shoulder 238 will cooperate with the flat 236 on the shank of the stripper to tightly secure the stripper in operative position.

Upon upward movement of the ram 41, the punch 26, in case it is stuck in the dimpled sheet S, pulls the sheet upwardly until the latter strikes the stripper 163, which is immovable relative to the yoke jaw 24. Thereafter, the sheet is held stationary while the punch 26, which is more firmly affixed to the holder 42 than to the work S, continues to rise until it releases itself from the sheet and permits the latter to drop to its normal position where it is supported on die 27.

Although in the illustrative embodiment of the invention the mechanism is shown as dimpling a single sheet, it has been found that stacked sheets may be simultaneously dimpled by the machine of the invention. Furthermore, the invention is not limited in its application to dimpling dies of the edge coining type as shown in Fig. 14, but is adaptable to dies and forming tools generally for performing dimpling, punching, pressing, crimping, riveting and similar operations.

What is claimed is:

1. A press comprising a fixed die adapted to support a work piece, a longitudinally movable ram, a punch supporting member telescopically slidable in the ram and adapted during movement to bring a movable punch down upon the work piece, a U-shaped yoke terminating in a pair of spaced jaws formed to carry the fixed die in one jaw and to support the movable ram in the other jaw, said jaws being adapted to spread in relation to each other within their elastic limit in reaction to the pressure applied by the operative parts in performing the pressing operation, pressure fluid operated means for driving the ram toward the fixed die, spring means to return said ram to initial position, a shiftable fluid control valve for controlling the flow of pressure fluid from a source of pressure fluid to a fluid operated means, an electric circuit, electrically operated means associated with said circuit capable of shifting said control valve from an initial position to an operative position in which said valve is effective to pass pressure fluid in one direction to said fluid operated means and cause the latter to drive the ram toward the fixed die, a switch in said circuit disposed adjacent the punch supporting member, means associated with the punch supporting member adapted upon a predetermined motion of said member toward the die to close said switch thereby to shift said valve to operative position to pass pressure fluid to actuate the ram toward the die, a stationary member secured at one end to one jaw of the yoke and having its other end arranged adjacent the other jaw of the yoke, a second switch in the circuit, means controlling said second switch adapted for operation in response to a predetermined relative movement between the spreading jaws and the stationary member to open the switch to stop the power movement of the ram, electrical means in said circuit for forestalling operation of said electrically operated valve control means to permit the spring means to return the ram to initial position, and a third switch in said circuit controllable by the operator to initiate operation of said electrically operated valve control means.

2. A press comprising a fixed die adapted to support a work piece, a longitudinally movable ram, a punch supporting member telescopically slidable in the ram and adapted during movement to bring a movable punch down upon the work piece, a U-shaped yoke terminating in a pair of spaced jaws formed to carry the fixed die in one jaw and to support the movable ram in the other jaw, said jaws being adapted to spread in relation to each other within their elastic limit in reaction to the pressure applied by the operative parts in performing the pressing operation, pressure fluid operated means for actuating the ram toward the fixed die, a fluid control valve, an electric circuit, electrically operated means capable of moving said control valve from an initial position to an operative position in which said valve is effective to pass pressure fluid in one direction to said fluid operated means to cause the latter to actuate the ram toward the fixed die, a switch in the circuit of the electrically operated valve shifting means disposed adjacent the punch supporting member, press lever means to control said switch, means on the punch supporting tool adapted upon a predetermined movement of the tool toward the die to actuate said press lever means to close said switch thereby to shift said valve to pass pressure fluid to actuate the ram toward the die, a stationary member secured at one end thereof to one jaw of said yoke and the other end terminating adjacent to the other jaw of the yoke, means responsive to a predetermined deflection of said yoke by expansion to stop operation of said electrically operated valve shifting means with consequent cessation of movement of the plunger and the movable punch toward the fixed die, and means to shift said valve to initial position.

3. A press according to claim 2 in which the switch closing means associated with the punch supporting member comprises a switch box, switch control means on the box, a press lever on the box adapted to actuate said control means, and a cam on the punch supporting member adapted upon predetermined movement of said member toward the die to move said lever to close said switch.

4. A press according to claim 2, wherein the ram has associated therewith a latch adapted to lock upon the punch supporting member when the ram is in extended operative position and to elevate said tool upon the return of the ram.

5. A press as in claim 2, wherein the ram has pivotally associated therewith a latch formed with at least one bayonet slot and the punch supporting member is provided with at least one pin arranged to engage a bayonet slot when the ram is in lowered position thereby to lock the tool to the ram for elevation upon the return stroke of the ram.

6. A press comprising a U-shaped yoke terminating in a pair of spaced jaws, a fixed die in one of said jaws, a hollow ram reciprocable in the other jaw and adapted to transmit pressure sufficient for a forming operation in sheet metal, pressure fluid operated means for actuating the ram on its power stroke, a shiftable fluid control valve for controlling the ram actuating means, an electric circuit, electrically operated means in said circuit for shifting the control valve to open position to transmit pressure fluid to actuate the ram on its power stroke, a switch in the circuit of the shifting means, means upon a jaw adjacent the ram for supporting said switch, a tool holder provided with a longitudinally slotted shank and adapted for slidable mounting in the ram and for independent movement relative thereto, said tool holder having a portion adapted to act as a cam, a pin rigidly mounted transversely of the ram and projecting through the slots of the shank of the tool holder, said pin being adapted to limit the movement of the tool holder with reference to the ram, spring means within the ram adapted to move the tool holder with reference to the ram and toward the die, the camming portion of said tool holder upon movement being adapted to close the switch in the electrically shifting means circuit thereby to actuate the electrically operated means to shift the control valve to open position, latch means associated with the ram and adapted to raise the tool holder from the die upon the elevation of the ram, and stop means upon the switch supporting means adapted to move said latch means to release the tool holder for movement toward the die.

7. A dimpling machine comprising a U-shaped yoke terminating in a pair of spaced jaws, a fixed die in one of said jaws, a dimpling tool, a hollow ram reciprocable in the other jaw adapted to carry said dimpling tool and to transmit pressure therethrough sufficient to dimple a preformed hole in sheet metal, pressure fluid operated means for actuating the ram, a shiftable fluid control valve for controlling the ram actuating means, an electric circuit, electrically operated means for shifting the control valve to open position thereby to transmit pressure fluid to actuate the ram on its power stroke, a switch in the circuit of the valve shifting means, a tool holder for the dimpling tool provided with longitudinal slots and slidably mounted in the ram, said holder being adapted for transmitting operating pressure from the ram through the dimpling tool to a work sheet, a pin having peripheral grooves adjacent its ends mounted transversely of the ram and projecting through the longitudinal slots in the tool holder to limit the movement of such holder in reference to the ram, snap rings mounted in the grooves of the pin to prevent axial movement thereof, a press lever associated with and adapted to actuate the switch, spring means within the ram to move the tool holder toward the die and adapted upon registration of the dimpling tool with a hole in a work piece to force the dimpling tool into said hole, and means upon the tool holder adapted upon a predetermined movement of the tool holder toward the die to move the press lever to actuate the switch to shift the control valve to open position thereby to stop further movement of the ram on its power stroke.

8. A press comprising a U-shaped yoke terminating in a pair of spaced jaws, a die in one of said jaws, a ram reciprocable in the other jaw, pressure fluid operated means for actuating the ram toward the die, spring means within the jaw adapted to return the ram to initial position upon the release of the pressure driving fluid, a shiftable fluid control valve for controlling the pressure fluid supplied to the ram driving means, a solenoid forming part of the control valve adapted upon energization to move the valve to direct the pressure fluid to drive the ram toward the die, an electric circuit, a switch in the circuit supplying current to the solenoid, a tool holder slidably mounted in the ram, a forming tool carried in the tool holder, means on the tool holder adapted to close said switch upon a predetermined movement of the tool holder toward the die, spring means within the ram adapted to move the tool holder toward the fixed die upon the registration of the tool with a hole in a work piece thereby to close the switch to drive the ram toward the die, means associated with the ram to limit the movement of the tool holder in the direction of the die, said last mentioned means comprising an electric switch adapted to be operated by said ram actuating means to de-energize the solenoid, and means forming part of the tool holder adapted to transmit the force of the ram through the tool to the die.

9. A metal working machine comprising a frame having opposed jaws for reception of a workpiece having preformed portions, a tool reciprocably carried by one of said jaws for operating on the workpiece, a motor in driving relationship with said tool, an electromagnetic controller for said motor, a first switch having a pair of normally open contacts, said tool having means responsive to alignment of a preformed portion with said tool to effect closure of said contacts, a second switch carried by said frame which is normally closed but which is opened upon application of overload forces to said jaws, a first circuit for connection with a source of electrical energy and including a winding of a first relay, an armature of a second relay, a first contact of said second relay, and a grounding connection, a second circuit for connection with said electrical source and including a winding of said second relay, a control switch, said first switch, and a grounding connection, and a third circuit for connection with said electrical source and including said electromagnetic controller, a second contact of said second relay, the armature of said second relay, the armature of said first relay, a contact of said first relay, said second switch, and a grounding connection, said third circuit being arranged to provide a time lag between opening of said second switch and reestablishment of the third circuit which is dependent upon the opening and closing of said first switch, the armature of said first relay being biased away from the contact thereof, while the armature of said second relay is biased toward the first contact thereof.

10. A metal working machine comprising a frame having opposed jaws for reception of a workpiece having preformed portions, a tool reciprocably carried by one of said jaws for operating on the workpiece, a motor in driving relationship with said tool, an electromagnetic controller for said motor, a first switch having a pair of normally open contacts, said tool having means responsive to alignment of a preformed portion with said tool to effect closure of said contacts, a second switch carried by said frame which is normally closed but which is open upon predetermined tool movement, a first circuit for connection with a source of electrical energy and including a winding of a first relay, an armature of a second relay, a first contact of said second relay, and a grounding connection, a second circuit for connection with said electrical source and including a winding of said second relay, a control switch, said first switch, and a grounding connection, and a third circuit for connection with said electrical source and including said electromagnetic controller, a second contact of said second relay, the armature of said second relay, the armature of said first relay, a contact of said first relay, said second switch, and a grounding connection, said third circuit being arranged to provide a time lag between opening of said second switch and re-establishment of the third circuit which is dependent upon the opening and closing of said first switch, the armature of said first relay being biased away from the contact thereof, while the armature of said second relay is biased toward the first contact thereof.

11. A metal working machine comprising a frame having opposed jaws for reception of a workpiece having preformed portions, a tool reciprocably carried by one of said jaws for operating on the workpiece, a motor in driving relationship with said tool, an electromagnetic controller for said motor, a first switch having a pair of normally open contacts, said tool having means responsive to alignment of a preformed portion with said tool to effect closure of said contacts, a second switch arrangement carried by said frame and including a switch which is normally closed but which is opened upon application of overload forces to said jaws and a switch which is normally closed but which is opened upon a predetermined tool movement, a first circuit for connection with a source of electrical energy and including a winding of a first relay, an armature of a second relay, a first contact of said second relay, and a grounding connection, a second circuit for connection with said electrical source and including a winding of said second relay, a control switch, said first switch, and a grounding connection, and a third circuit for connection with said electrical source and including said electromagnetic controller, a second contact of said second relay, the armature of said second relay, the armature of said first relay, a contact of said first relay, said second switch arrangement, and a grounding connection, said third circuit being arranged to provide a time lag between opening of said second switch arrangement and re-establishment of the third circuit which is dependent upon the opening and closing of said first switch, the armature of said first relay being biased away from the contact thereof, while the armature of said second relay is biased toward the first contact thereof.

12. In a press for the dimpling of sheet material containing pre-formed holes, the combination comprising a frame having opposed jaws for reception of the sheet material, a dimpling tool reciprocably carried by one of said jaws for operating on said sheet material and including a pilot member, fluid pressure actuated means for driving the dimpling tool toward the opposite jaw, a valve means for controlling fluid pressure flow, an electro-magnetic operator for said valve means, a first switch means having a pair of contacts closed by movement of said pilot member into one of the pre-formed holes, a second switch carried by said frame which is normally closed but which is opened upon application of overload forces to said jaws, a first circuit for connection with a source of electrical energy and including a winding of a first relay, an armature of a second relay, a first contact of said second relay, and a grounding connection, a second circuit for connection with said electrical source and including a winding of said second relay, a control switch, said first switch, and a grounding connection, and a third circuit for connection with said electrical source and including said electro-magnetic operator, a second contact of said second relay, the armature of said second relay, the armature of said first relay, a contact of the first relay, said second switch, and a grounding connection, said third circuit being arranged to provide a time lag between opening of said second switch and re-establishment of the third circuit which is dependent upon the opening and closing of said first switch, the armature of said first relay being biased away from the contact thereof, while the armature of said second relay is biased toward the first contact thereof.

13. In a press for the dimpling of sheet material containing pre-formed holes, the combination comprising a frame having opposed jaws for reception of the sheet material, a dimpling tool reciprocably carried by one of said jaws for operating on said sheet material and including a pilot member, fluid pressure actuated means for driving the dimpling tool toward the opposite jaw, a valve means for controlling fluid pressure flow, an electro-magnetic operator for said valve means, a first switch means having a pair of contacts closed by movement of said pilot member into one of the pre-formed holes, a second switch carried by said frame which is normally closed but which is opened upon pre-determined tool movement, a first circuit for connection with a source of electrical energy and including a winding of a first relay, an armature of a second relay, a first contact of said second relay, and a grounding connection, a second circuit for connection with said electrical source and including a winding of said second relay, a control switch, said first switch, and a grounding connection, and a third circuit for connection with said electrical source and including said electro-magnetic operator, a second contact of said second relay, the armature of said second relay, the armature of said first relay, a contact of said first relay, said second switch, and a grounding connection, said third circuit being arranged to provide a time lag between opening of said second switch and re-establishment of the third circuit which is dependent upon the opening and closing of said first switch, the armature of said first relay being biased away from the contact thereof, while the armature of said second relay is biased toward the first contact thereof.

14. In a press for the dimpling of sheet material containing pre-formed holes, the combination comprising a frame having opposed jaws for reception of the sheet material, a dimpling tool reciprocably carried by one of said jaws for operating on said sheet material and including a pilot member, fluid pressure actuated means for driving the dimpling tool toward the opposite jaw, a valve means for controlling fluid pressure flow, an electro-magnetic operator for said valve means, a first switch means having a pair of contacts closed by movement of said pilot member into one of the pre-formed holes, a second switch arrangement carried by said frame and including a switch which is normally closed but which is opened upon application of overload force to said jaws and a switch which is normally closed but which is opened upon a predetermined tool movement, a first circuit for connection with a source of electrical energy and including a winding of a first relay, an armature of a second relay, a first contact of said second relay, and a grounding connection, a second circuit for connection with said electrical source and including a winding of said second relay, a control switch, said first switch, and a grounding connection, and a third circuit for connection with said electrical source and including said electro-magnetic operator, a second contact of said second relay, the armature of said second relay, the armature of said first relay, a contact of said first relay, said second switch arrangement, and a grounding connection, said third circuit being arranged to provide a time lag between opening of said second switch arrangement and re-establishment of the third circuit which is dependent upon the opening and closing of said first switch, the armature of said first relay being biased away from the contact thereof, while the armature of said second relay is biased toward the first contact thereof.

HOWARD R. FISCHER.

REFERENCES CITED

The following references are of record in the file of this patent:

UNITED STATES PATENTS

| Number | Name | Date |
|---|---|---|
| 1,454,777 | Walker | May 8, 1923 |
| 2,375,707 | Speller | May 8, 1945 |
| 2,418,736 | Styes | Apr. 8, 1947 |
| 2,438,837 | Archer et al. | Mar. 30, 1948 |

FOREIGN PATENTS

| Number | Country | Date |
|---|---|---|
| 155,204 | Great Britain | Jan. 12, 1922 |